May 1, 1923.

C. W. SNODGRASS ET AL 1,453,413

GEAR TRANSMISSION

Filed Jan. 20, 1922

Inventor
Charles W. Snodgrass
and Walter R. Whitmoyer
By E. H. Bond
Attorney

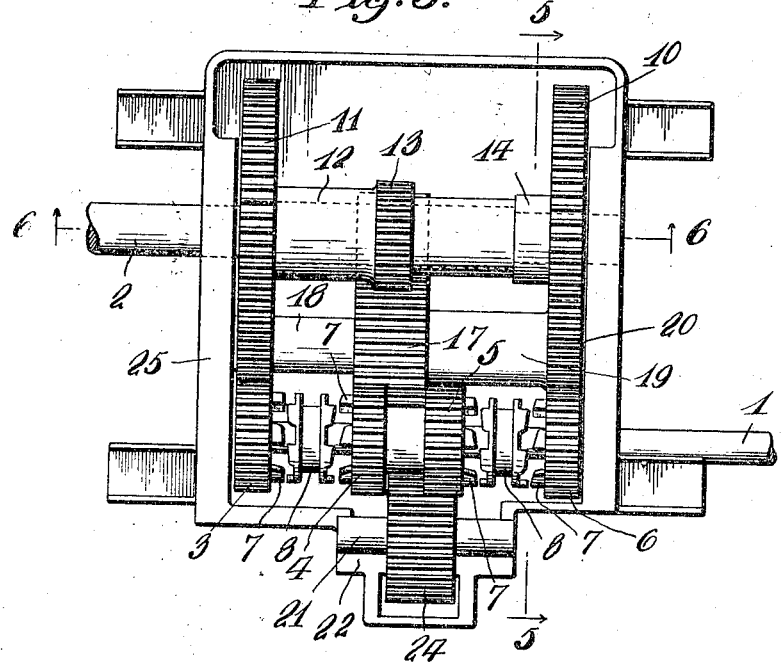

May 1, 1923.

C. W. SNODGRASS ET AL

GEAR TRANSMISSION

Filed Jan. 20, 1922

Inventors
Charles W. Snodgrass
and Walter R. Whitmoyer
By E. K. Bond
Attorney

Patented May 1, 1923.

1,453,413

UNITED STATES PATENT OFFICE.

CHARLES W. SNODGRASS, OF DENVER, COLORADO, AND WALTER R. WHITMOYER, OF DETROIT, MICHIGAN, ASSIGNORS TO ROBERT O. BOLLES, CHARLES W. SNODGRASS, AND WALTER R. WHITMOYER, TRUSTEES OF S. & W. TRANSMISSION ASSOCIATION, OF DENVER, COLORADO.

GEAR TRANSMISSION.

Application filed January 20, 1922. Serial No. 530,638.

*To all whom it may concern:*

Be it known that we, CHARLES W. SNODGRASS and WALTER R. WHITMOYER, citizens of the United States, residing at Denver, in the county of Denver, State of Colorado, and Detroit, in the county of Wayne and State of Michigan, respectively, have invented certain new and useful Improvements in Gear Transmission, of which the following is a specification.

This invention relates to certain new and useful improvements in gear transmission and it has for its objects to secure closer regulation and to reduce power losses to a minimum. As the loss of power in transmission is especially great at high speed, we provide means for reducing such loss to a minimum when the mechanism is being operated at the high speed. While the construction herein disclosed is primarily designed for use upon motor vehicles and particularly automobiles, it is capable of use in other relations and, hence, it is to be understood that the invention is not limited in this respect.

It has for a further object to insure greater efficiency and to provide a construction wherein all the small gears are the same size and all the large gears are of the same size.

We employ six gears to give triple reduction, for low speed, and when these are in mesh we have in effect high leverages. By pulling the small gears against the big gears throughout the complete transmission, we obtain the effect of high leverage.

The present transmission is a triple reduction or equalization of a high leverage gear device, pulling the short way of the leverage; the term "equalization" is understood to mean that the small gears are all of one size, and all the large gears are of one size. By using a triple reduction in low speed, we obtain an even steady flow of power so that one can turn the rear wheels with a slow steady revolution, which enables one to get out of ruts or bad places as one is able to get traction so that the wheels will not dig themselves into the ground. The high reduction also prevents the rear wheels from back gearing up against the motor and choking the same, as it permits the motor to run with the proper revolutions so as to insure full combustion and power and, hence, it is not necessary to race the motor so fast before letting in the clutch in order to keep from stalling the motor. No matter what the speed all the gears are constantly in mesh and in motion, those otherwise inoperative serving as fly wheels, thus insuring continuous revolution.

By this arrangement we are enabled to obtain a much lower reduction in low speed, and also a low reduction in intermediate, but substantially the same ratio in high speed as in the usual forms of transmission. This enables us to start three times the load, then to go into intermediate, and then into high, traveling at the same rate of speed as heretofore.

It is a well known fact that motor vehicles can pull three times as much as they can start.

We use a high reduction for low speed which eliminates stopping the revolution of the gears, when connected up to the driven shaft.

The shifting is done through the medium of clutches which dovetail into the small pinions, giving different speeds. When shifting from low to intermediate, the low gear remains in mesh and revolves. When shifting into high, the low and intermediate gears are in mesh and always revolve, thus at all times keeping up momentum.

When in low, we drive through a part of the intermediate and high gears and the differential. When driving in intermediate, we drive through a part of the high gear and the differential, and reverse is through a part of the intermediate gears, a part of the high gears and differential, the gears being always in mesh and revolving in all speeds.

We effect great saving in power, and are able to start a load as big as can be pulled by the engine.

Another great advantage is the compactness of parts and the ease of assemblage thereof.

By our construction and arrangement of parts, we are able to deliver substantially ninety per cent of the engine power, as the resistance cannot back gear against the motor and choke it down, owing to the arrangement and leverage of our transmission.

Other objects and advantages of the invention will hereinafter appear, and the novel features thereof will be specifically defined by the appended claims.

The invention is capable of embodiment in a variety of forms, one only of which we have chosen to herein illustrate.

The invention, in such preferred form, is clearly illustrated in the accompanying drawings, which, with the numerals of reference marked thereon, form a part of this specification, and in which Figure 1 is an end elevation of our improved transmission.

Figure 3 is a top plan of another form of embodiment of the invention.

Figure 4 is an end elevation thereof.

Like numerals of reference indicate like parts throughout the several views.

Referring to the drawings:—

1 designates the motor shaft and 2 the drive shaft.

Figure 8:
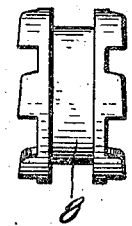
Figure 8 is an edge view thereof.

On the motor shaft are four small gears or pinions 3, 4, 5 and 6. These are all loose upon their shaft and each has upon one face thereof clutch members 7, as seen clearly in Figure 2. These pinions are adapted to revolve at all times by reason of their meshing with their companion gears, as will hereinafter appear, although they do not revolve with their shaft except when caused to do so by shifting the clutches. These clutches 8 are keyed to the motor shaft so as to revolve therewith, but are also mounted to slide on the said shaft, there being two of these clutches, one between two pinions, as seen in Figure 2, so that the two clutches serve with the four pinions, each clutch being movable to the right or left, as occasion may require, the clutch being double-faced, as seen in Figures 2 and 8, for this purpose. The clutches are adapted to be shifted in any well-known or approved way. 9 in Figure 1 indicate the clutch shifting arms.

Figure 5:
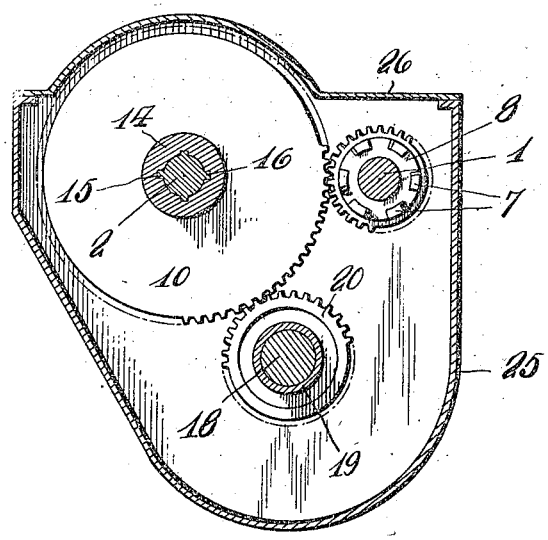
Figure 5 is a section on the line 5—5 of Figure 3, looking in the direction of the arrows.
Figure 6:
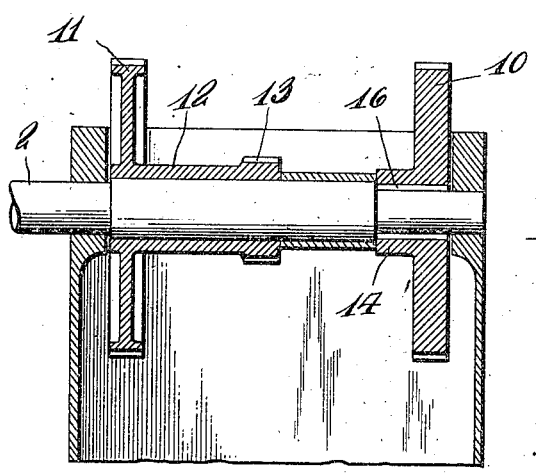
Figure 6 is a section on the line 6—6 of Figure 3, looking in the direction of the arrows.
Figure 7:
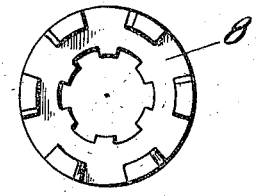
Figure 7 is an end view of one of the clutch members.

Fast on the drive shaft is a large gear 10. Loosely mounted on the drive shaft, but mounted to revolve at all times, is the large gear 11, as seen in Figure 6. This gear 11 is carried by a sleeve 12 fast upon which is a small gear or pinion 13, as seen in Figure 6. The gear 10 may be secured to its shaft in any well-known way. In Figure 5 it is shown as provided with a hub 14 having a plurality of key ways 15 for the reception of the keys 16.

Figure 1:
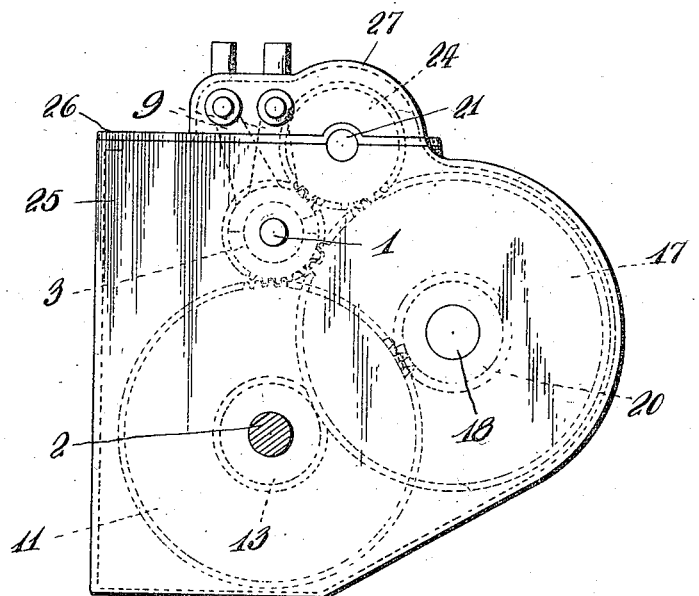
Figure 2:
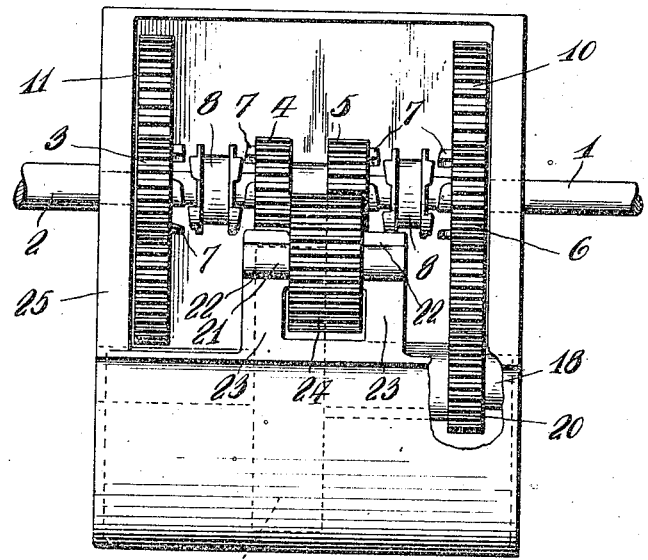
Figure 2 is a top plan thereof with the cover plate removed and a portion of the casing broken away.

17 is the intermediate gear loose at all times on its shaft if the shaft be fast, but if the shaft be mounted to turn this intermediate gear should be fast to its shaft 18. 19 is a sleeve rigid with the intermediate gear 17 and carrying at one end a small pinion or gear 20 adapted to mesh with the high gear 10 on the drive shaft, as seen in Figure 1.

21 is a shaft mounted in suitable bearings 22 on the supports 23, as seen in Figure 2, and upon this shaft is an idler gear 24 which is a double gear, that is of sufficient width to mesh with the intermediate gear 17 and the small pinion 5 on the motor shaft. Gear 17 is likewise a double gear.

25 is the casing for the parts, provided with a removable cover 26 secured in place in any suitable manner and, in this instance, shown as provided with an enlargement 27 to accommodate the idler gear 24, as seen in Figure 1.

It is to be noted that all the small gears are all substantially the same size and that the large gears are also all of the same size. We use the broad or double gear, the intermediate gear, for both intermediate and reverse speeds.

Roller bearings are to be employed where necessary. They may be of any desired type.

With the parts arranged substantially as above described, the operation is as follows:—

Referring to Figure 2, the motor being started, all parts being in neutral position, as seen in Figure 2, the motor shaft 1 is revolved, the clutch 8 at the left hand side of this figure is shifted to the left into engagement with the clutch members 7 on the gear 3, causing this gear or pinion to revolve with the shaft 1. The gear 3 meshing with the gear 11, revolves the latter and this, in turn, revolves the gear 13, which latter meshing with the intermediate gear 17, turns the gear 20 which meshes with the high gear 10, revolving the same and, consequently, the drive shaft 2. This gives low speed. The clutch 8 at the left is thrown into neutral position, and then the clutch 8 at the right of Figure 2 is now shifted to the left to engage the clutch members 7 of the small pinion or gear 5 which meshes with the idler gear 24, the latter driving the intermediate gear 17, which, in turn, revolves the gear 20 and this meshing with the high gear 10 gives intermediate speed to the drive shaft 2. To obtain high speed, the clutch 8 at the right hand of Figure 2 is now moved to the right to engage with the clutch members 7 of the gear or pinion 6 and thus turning the high gear 10 which imparts to the shaft 2 high speed.

To reverse, the clutch 8 at the left being in neutral, the clutch 8 at the right in Figure 2 is moved to neutral, and then the clutch at the left of Figure 2 is moved to the right to engage the clutch members of the gear or pinion 4, turning the intermediate gear 17, and through this the gear 20 and this meshing with the gear 10 turns the drive shaft 2 in the reverse direction.

The relative disposition of the parts may be varied to suit varying conditions. For instance, in Figure 3 we have shown the parts as differently disposed relatively to each other, but in both forms the operation is the same. The only change is in the relative disposition of the motor and drive shafts, the shape of the casing being correspondingly changed. The form shown in Figure 3 is applicable for use on a four-wheeled drive truck, tractors or machines that drive off centre. The form shown in Figure 2 is adapted for use on all styles of centre drive machines, such as the automobiles generally in use.

From the foregoing, it will be seen that we have devised a compact, efficient and reliable transmission, for performing the work to which it may be assigned, and, while the structural embodiment of the invention as herein disclosed is what we, at the present time, consider preferable, it is evident that the same is subject to changes, variations and modifications in detail, proportions and relative disposition of parts without departing from the spirit of the invention or sacrificing any of its advantages. We, therefore, do not intend to restrict ourselves to the particular construction and relative proportion of parts hereinbefore described, and shown in the drawings, but reserve the right to make such changes, variations and modifications in detail, proportion of parts etc., as come within the scope of the appended claims.

What is claimed as new is:—

1. A variable speed transmission having driving and driven shafts, comprising a plurality of clutch-controlled pinions on the driving shaft, a fixed and a loose gear having a connected pinion on the driven shaft, said loose gear meshing with said clutch-controlled pinion, and a counter shaft having an interconnected gear and pinion thereon meshing respectively with the pinion and the fixed gear on the driven shaft.

2. A variable speed transmission having driving and driven shafts, comprising a plurality of clutch-controlled pinions on the driving shaft, a fixed and a loose gear having a connected pinion on the driven shaft, said loose gear meshing with one of said clutch-controlled pinions, and a counter shaft having an interconnected gear and pinion thereon meshing respectively with the pinion and the fixed gear on the driven shaft, said counter shaft gear also meshing with a second of said clutch-controlled pinions.

3. A variable speed transmission having driving and driven shafts, comprising a plurality of clutch-controlled pinions on the driving shaft, a fixed and a loose gear having a connected pinion on the driven shaft, said loose gear meshing with one of said clutch-controlled pinions, a counter shaft having an interconnected gear and pinion thereon meshing respectively wth the pinion and the fixed gear on the driven shaft, said counter shaft gear also meshing with a second of said clutch-controlled pinions, and an idler gear meshing with a third of said clutch-controlled pinions and said counter shaft gear.

4. A variable speed transmission having driving and driven shafts, comprising a plurality of clutch-controlled pinions on the driving shaft, a fixed and a loose gear having a connected pinion on the driven shaft, said loose gear meshing with one of said clutch-controlled pinions, a counter shaft having an interconnected gear and pinion thereon meshing respectively with the pinion and the fixed gear on the driven shaft, said counter shaft gear also meshing with a second of said clutch-controlled pinions, and an idler gear meshing with a third of said clutch-controlled pinions and said counter shaft gear, said pinions and gears being respectively of the same size.

5. A variable speed transmission having driving and driven shafts comprising a plurality of clutch-controlled pinions on the driving shaft, a fixed and a loose gear having a connected pinion on the driven shaft, said fixed and loose gears meshing respectively with a pair of said clutch-controlled pinions, and a counter shaft having an interconnected gear and pinion thereon meshing respectively with the pinion and the fixed gear on the driven shaft.

6. A variable speed transmission having driving and driven shafts comprising a plurality of clutch-controlled pinions on the driving shaft, a fixed and a loose gear having a connected pinion on the driven shaft, said fixed and loose gears meshing respectively with a pair of said clutch-controlled pinions, and a counter shaft having an interconnected gear and pinion thereon meshing respectively with the pinion and the fixed gear on the driven shaft, said counter shaft gear also meshing with a third of said clutch-controlled pinions.

7. A variable speed transmission having driving and driven shafts comprising a plurality of clutch-controlled pinions on the driving shaft, a fixed and a loose gear having a connected pinion on the driven shaft, said fixed and loose gears meshing respectively with a pair of said clutch-controlled pinions, a counter shaft having an interconnected gear and pinion thereon meshing respectively with the pinion and the fixed gear on the driven shaft, said counter shaft gear also meshing with a third of said clutch controlled pinions, and an idler gear meshing with a fourth of said clutch-controlled pinions and said counter shaft gear.

8. A variable speed transmission having driving and driven shafts comprising a plurality of clutch-controlled pinions on the driving shaft, a fixed and a loose gear having a connected pinion on the driven shaft, said fixed and loose gears meshing respectively with a pair of said clutch-controlled pinions, a counter shaft having an inter-connected gear and pinion thereon meshing respectively with the pinion and the fixed gear on the driven shaft, said counter shaft gear also meshing with a third of said clutch controlled pinions, and an idler gear meshing with a fourth of said clutch-controlled pinions and said counter shaft gear, said pinions and gears being respectively of the same size.

9. A variable speed transmission having driving and driven shafts, comprising a plurality of clutch-controlled pinions on the driving shaft, a fixed and a loose gear having a connected pinion on the driven shaft, an intermediate gear having a connected pinion meshing with the fixed gear, and an idler gear meshing with said intermediate gear and one of said clutch-controlled pinions and operative for intermediate speed, said fixed and loose gears meshing with two of said clutch-controlled pinions and said intermediate gear meshing with said first mentioned connected pinion.

10. In a variable speed gear transmission, a driving shaft, a pair of clutch-controlled pinions thereon, an ultimately-driven shaft, a fixed gear thereon meshing with one of said pinions, an intermediate shaft having a connected gear and pinion, the latter of which meshes with said fixed gear, and an idler meshing with the second of said clutch-controlled pinions and the gear on the intermediate shaft.

In testimony whereof we affix our signatures.

CHARLES W. SNODGRASS,
WALTER R. WHITMOYER.